United States Patent
Waks et al.

(10) Patent No.: US 12,513,382 B2
(45) Date of Patent: Dec. 30, 2025

(54) METHODS AND SYSTEMS FOR IMAGE CORRECTION AND PROCESSING IN HIGH-MAGNIFICATION PHOTOGRAPHY EXPLOITING PARTIAL REFLECTORS

(71) Applicant: LUMENUITY, LLC, Cabin John, MD (US)

(72) Inventors: Edo Waks, Maryland, MD (US); Benjamin Shapiro, Maryland, MD (US)

(73) Assignee: Lumenuity, LLC, Cabin John, MD (US)

( * ) Notice: Subject to any disclaimer, the term of this patent is extended or adjusted under 35 U.S.C. 154(b) by 73 days.

(21) Appl. No.: 18/337,917

(22) Filed: Jun. 20, 2023

(65) Prior Publication Data

US 2023/0336858 A1    Oct. 19, 2023

Related U.S. Application Data

(63) Continuation of application No. PCT/US2021/073018, filed on Dec. 17, 2021.
(Continued)

(51) Int. Cl.
*H04N 23/55*    (2023.01)
*G02B 13/00*    (2006.01)
(Continued)

(52) U.S. Cl.
CPC .......... *H04N 23/55* (2023.01); *G02B 13/002* (2013.01); *G02B 13/0065* (2013.01); *G06T 5/50* (2013.01);
(Continued)

(58) Field of Classification Search
None
See application file for complete search history.

(56) References Cited

U.S. PATENT DOCUMENTS

| | | | |
|---|---|---|---|
| 2003/0002048 A1* | 1/2003 | Zanoni | G01B 9/02057 356/512 |
| 2010/0165134 A1* | 7/2010 | Dowski, Jr. | G02B 3/0025 257/E31.127 |

(Continued)

OTHER PUBLICATIONS

International Search Report and Written Opinion of the International Searching Authority, dated Apr. 27, 2022, from corresponding International Application No. PCT/US2021/073018.

*Primary Examiner* — James M Hannett
(74) *Attorney, Agent, or Firm* — Leydig, Voit & Mayer, Ltd.

(57) ABSTRACT

Described herein are systems and methods for reducing image aberrations in high magnification photography with partial reflectors. In particular, by an imaging device or camera that is built into or is included in a cell phone, smart phone, tablet, laptop or any other mobile device. The systems and methods include a light passing through a lens, a portion of said light then undergoes a number of partial reflections in-between two partial reflectors, and a portion of said light then reaches an imaging sensor. The partial reflections enable a longer light path to reach the imaging sensor, thus enabling a longer focal length to be used, which enables higher magnification. Described are methods and embodiments to select the physical parameters of optical elements in systems with partial reflectors, in order to create images with reduced image aberrations.

14 Claims, 7 Drawing Sheets

Related U.S. Application Data

(60) Provisional application No. 63/126,942, filed on Dec. 17, 2020, provisional application No. 63/127,081, filed on Dec. 17, 2020, provisional application No. 63/127,047, filed on Dec. 17, 2020, provisional application No. 63/127,052, filed on Dec. 17, 2020.

(51) Int. Cl.
  *G06T 5/50* (2006.01)
  *G06T 5/75* (2024.01)
  *H04N 23/80* (2023.01)

(52) U.S. Cl.
  CPC .............. *G06T 5/75* (2024.01); *H04N 23/80* (2023.01); *G06T 2207/20221* (2013.01)

(56) References Cited

U.S. PATENT DOCUMENTS

2013/0101212 A1\* 4/2013 Demandolx .............. G06T 5/75
  382/167
2013/0194675 A1\* 8/2013 Tocci .................. G02B 27/144
  359/636

\* cited by examiner

METHODS AND SYSTEMS FOR IMAGE CORRECTION AND PROCESSING IN HIGH-MAGNIFICATION PHOTOGRAPHY EXPLOITING PARTIAL REFLECTORS

TECHNICAL FIELD

The application relates generally to the field of high-magnification photography and imaging techniques. More specifically, the application relates to systems and methods for correction of image aberrations in high magnification cameras or imaging devices that include the use of partial reflectors. The application also relates to imaging devices or cameras built into a cell phone, smartphone, tablet, laptop or any other mobile devices.

BACKGROUND

Digital cameras are widely used in mobile devices. Their performance is a major differentiator for consumers and is a driver for market share. Hence mobile device makers and suppliers strive to improve camera performance.

One key aspect of mobile device camera performance is high-magnification (or high-zoom) photography. Typically, cameras or imaging devices that achieve high-magnification photography have long and large lens assemblies (e.g. zoom lenses in DSLR cameras). But mobile devices are thin and compact and cannot contain long lens assemblies, which has traditionally limited their magnification and zoom capabilities.

US Patent Application 2021/0211563 (by Edo Waks, Benjamin Shapiro) discloses systems and methods for producing high-magnification images of objects for a camera or imaging device that is thin and can fit inside the thickness of a cell phone, smart phone, tablet, laptop or other mobile devices. In particular it discloses the use of partial reflections between partially-reflective surfaces inside the camera or imaging system, to increase the path light length, and to thereby enable a long focal length and a high magnification inside a thin camera or imaging system.

The application provides solutions to reduce image aberrations for cameras or imaging devices that include partial reflectors, and that can be incorporated into mobile devices such as cell phones, smartphones, tablets, laptops, etc. The application includes both hardware solutions (selection of optical elements and their placement and properties) and software solutions (selection of imaging methods and algorithms).

SUMMARY

This application discloses systems and methods for reducing image aberrations in cameras with partial reflectors. All camera and imaging systems suffer to some degree from image aberrations. Image aberrations refer to defects or imperfections in a formed image due to the inability of cameras or imaging devices or optical systems to take perfect images. Image aberrations can include out-of-focus and focus shift effects, coma, astigmatism, field curvature, distortion, spherical and chromatic aberrations, wavefront errors, field distortion (pincushion or barrel distortion), vignetting, ghosting or flare, diffraction, and other types of aberrations. The methods and systems can produce a high-magnification image with reduced image aberrations. The disclosed imaging or camera systems can fit into thin and compact mobile devices, and make use of partial reflectors. Particularly, the application provides methods and systems for reducing image aberrations for cameras or imaging devices that include partial reflectors, to enable high-magnification high-quality photography for mobile devices.

Other aspects provide for systems with optical elements (e.g., at least one lens, two partial reflectors) and an imaging sensor (e.g., time-integrating sensor), wherein the light that forms an in-focus image on the sensor completes at least one round-trip partial reflection between the partial reflectors. The properties of the optical elements (location, size, shape, materials, coatings) are selected to enable high-magnification and reduced image aberrations in a small volume device. Image processing algorithms are provided to extract the in-focus component of the image formed on the sensor, and to process it to reduce image aberrations.

DETAILED DESCRIPTION

Figure 1:
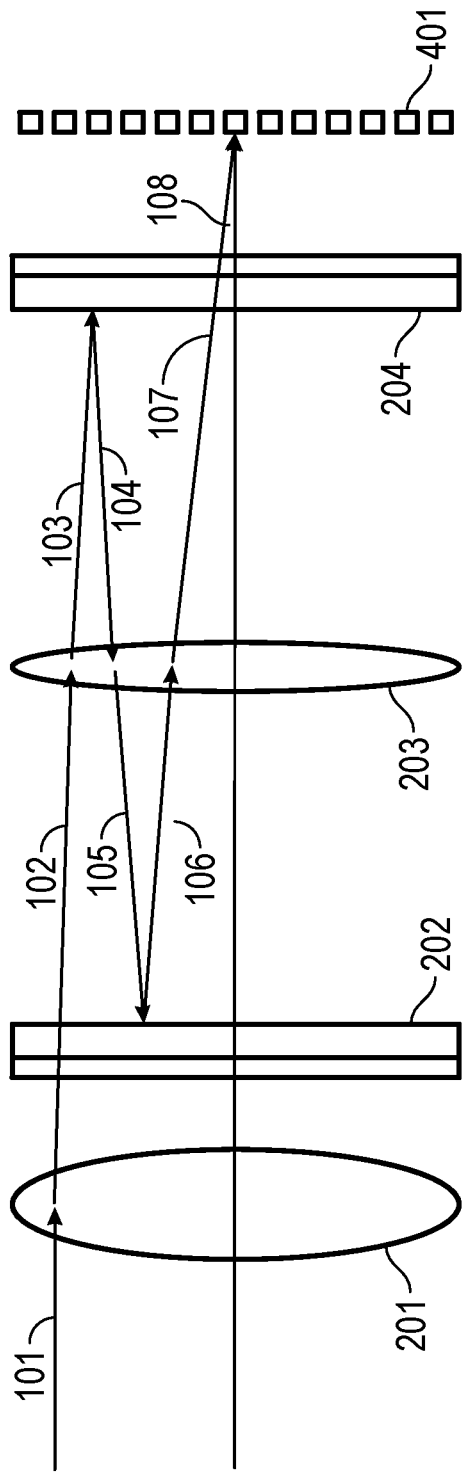
FIG. 1 shows an exemplary system for reducing spherical aberrations, by having at least one lens between partial reflectors.

This application will now be described more fully with reference to the accompanying drawings in which preferred embodiments of the invention are shown. This invention may, however, be embodied in many different forms and should not be construed as being limited to the embodiment set forth herein.

It is known that there are always some distortions and aberrations in the images formed by any camera due to the physical and optical limitations of lenses, of other optical elements, and due to limitations of image processing firmware and software. Image aberrations can include out-of-focus and focus shift effects, coma, astigmatism, field curvature, distortion, spherical and chromatic aberrations, wavefront errors, field distortion (pincushion or barrel distortion), vignetting, ghosting or flare, diffraction, and other types of aberrations.

Embodiments includes systems and methods for improving and correcting images from cameras or imaging devices or optical systems with partial reflectors. These include disclosing configurations of the camera or imaging system, including exemplary location, size, shape, materials and material properties, surface coatings, focal lengths, indexes of refraction, absorption, and scattering, and other aspects of system optical elements such as lenses, partial-reflectors, prisms, and mirrors. Additionally disclosed are exemplary methods to select the configuration of cameras or imaging systems with partial reflectors, and also disclosed are exemplary designs. Further disclosed are imaging processing methods and algorithms to extract in-focus reduced-aberration images from the images that are formed on the sensor (e.g. time-integrating sensor). Particularly, embodiments of the present invention provide methods and systems for reducing image aberrations for cameras or imaging devices that include partial reflectors to enable high magnification in a small or thin mobile device.

Although a single spherical lens with a large focal length can achieve high magnification, in US Patent Application 2021/0211563 (by Edo Waks, Benjamin Shapiro) it was disclosed that adding partial reflectors and image processing allows a single spherical lens to achieve high magnification in a small or thin device. But a single spherical lens typically also creates strong spherical aberrations. Hence it is advantageous to use multiple lenses, to correct for aberrations. For example, a sequence of even longer focal length lenses can be used to achieve the net desired focal length, but with reduced aberrations, e.g., with reduced spherical aberrations.

As disclosed herein, the partial reflectors create new and novel opportunities to correct image aberrations. In particular, optical systems with partial reflectors allow light to visit optical elements multiple times, meaning that a single optical element can interact with a light beam multiple times. This fundamentally changes how optical elements interact and provides for the inventive configurations, component selections and shapes, and image processing algorithms disclosed herein.

Ordinarily, if a certain focal length is desired, that focal length can be achieved by having two or more lenses with longer focal lenses and using them together to achieve the desired focal length. The benefit of doing so is that lenses with longer focal lenses create less aberration, hence multiple lenses with longer focal lenses achieve the same desired focal length, but with less spherical aberration. Ordinarily, light interacts with each lens one time, as it passes from scene, through each lens, to the imaging sensor.

We disclose a method for reducing and correcting image aberrations, such as spherical aberrations, by exploiting multiple partial reflections that cause light to interact with one, some, or all of the optical elements multiple times. For example, since a lens acting on the light multiple times will function like many copies of the same lens acting on that light, hence a lens with an even longer focal length can be employed. Thus aberrations may be reduced further than in conventional camera systems, by designing optical elements to exploit partial reflections, as disclosed herein.

Embodiment: Multiple Light Passes Through a Lens Aids Reduction of Spherical Image Aberrations An exemplary system is illustrated in FIG. 1. The system is composed of a lens (201), a partial reflector (202), a second lens (203), a second partial reflector (204), and an imaging sensor (401). Incoming light (101) goes through the first lens then reflects a desired number of times between the partial reflectors (e.g. one round trip 102, 103 104, 105, 106, 107 to form the in-focus component of the image), and that light (108) is detected by the sensor (401). In one example, the focal length of the first lens is longer than the total path length traveled by the light after it has undergone the desired number of partial reflections and reaches the sensor. If K is the desired number of round-trip partial reflections, then a light ray will pass through the second lens 2K+1 times to form the desired in-focus image component on the sensor. On each pass the second lens (203) will partially focus the beam, such that overall it will help form a focused image component at the image sensor after the K round-trip reflections. By having the light pass multiple times through the second lens, that len's focal length acts multiple times over, amplifying its focusing effect. This means a longer focal length can be chosen for both lenses (201 and 203). And this in turn means spherical aberration can be reduced, because spherical aberration decreases with increasing focal length.

Thus as disclosed in the exemplary FIG. 1, partial reflectors and a lens between them enable an overall camera desired focal length with less aberration, because it allows use of lenses with longer focal lengths, which allows the desired overall camera focusing but with less spherical aberration. The benefit of reaching the desired camera focal length but with less aberration is improved because the second lens (203) acts 2K+1 times, thus it can have an even longer focal length and enable less aberration. The disclosed exemplary system further enables use of thinner lenses (since each lens can have a longer focal length), which in turn further allows the reduction of the size of the imaging system (thin lenses take less room than thick lenses).

This application further discloses using curved partially-reflective mirrors to achieve a desired camera focal length with reduced aberrations effect. With partial reflections, one or more curved partial reflectors can be used with a longer focal length, to achieve a desired camera focal length but incur less aberrations. This is because the light path will visit a curved partially-reflective element multiple times, e.g. K+1 times for K round-trip partial reflections, and each visit will cause additional focusing, but with reduced aberration (because of the longer focal length of the curved partial reflector). In addition, curved reflectors also do not introduce chromatic aberration, so this enables mitigating multiple aberrations simultaneously.

Also disclosed is using a combination of lenses and flat or curved partial reflectors. Then the partial-reflections visit longer focal length lenses, and/or longer focal length curved reflectors, or both, multiple times, and thus create the desired camera focal length but with reduced aberrations.

Embodiment: System with Shaped Lenses and Two Partial Reflectors with Flat Reflective Surfaces In an embodiment, the present invention provides for shaping (e.g. curving) of optical elements for systems with partial reflectors, to reduce aberrations. In one exemplary embodiment a system with two shaped lenses, two partial reflectors whose reflective surfaces are flat but their other surfaces are shaped, and a sensor is disclosed, such that a focused image is formed on the sensor after one round-trip reflection between the two partial reflectors. And the image is formed with reduced image aberrations.

Figure 2:
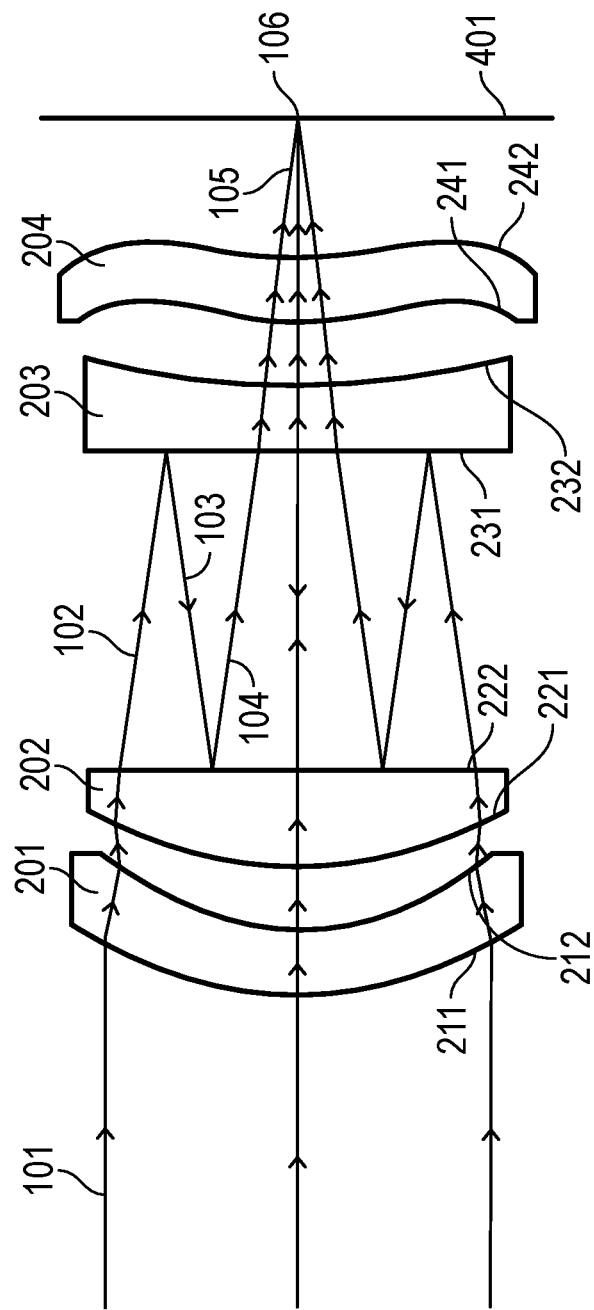
FIG. 2 shows a system with lenses, two partial reflectors, and a sensor, wherein a focused image is achieved after one round-trip reflection (labeled as 102, 103, 104) between the partial reflectors, and the number, type, placement, shape, and materials of the optical elements has been selected to reduce image aberrations.

The exemplary placement and shape of the optical elements (lenses, partial reflectors) is shown in FIG. 2, and these elements have been selected to reduce image aberration of the focused image. Specifically incoming light (101) passes through a first lens (201), part of the light (102) then passes through the partial reflector (202) and undergoes one intended round trip reflection (102, 103, 104) by partially reflecting from the second partial reflector (203), a part of the light (105) then passes through the second partial reflector (203) and the second lens (204) to reach the sensor (401) at the focus point (106). For clarity only, other paths of the light (e.g. no round trip; and 2, 3, 4, etc. round trip reflections) are not shown, since in this embodiment they will not be in focus at the (401) sensor plane.

This embodiment was selected by a combination of experience, innovation and mathematical optimization. Specifically, optical element placement, size, and shapes were selected to enable high performance, as well as manufacturability and mass production. For example, the degree of curvature of lenses was selected to enable their manufacture by standardly available lens mass manufacturing methods.

In this embodiment, both surfaces (211 and 212) of the first lens (201), and both surfaces (241 and 242) of the second lens (204), and the non-reflecting surfaces (221 and 232) of both partial reflectors (202 and 203), have been shaped (curved) to minimize image aberrations. We disclose that these curved shapes can be aspherical (curve not approximately a portion of a circle), and have been chosen by the optimization methods disclosed herein. But in this embodiment the partially-reflective surfaces (222 and 231) of both partial reflectors (202 and 203) have been left flat. It will be obvious to someone familiar with the art of optics and lens design that other combinations of lenses and partial reflectors are possible, and that other combinations of surfaces can be chosen to be shaped (curved) or left flat, and that the intended number of partial round-trip reflections for a focused image could differ (e.g. 2, 3, 4, etc. instead of 1). The embodiment disclosed is an example, and it is understood other combinations and choices are possible and are covered by this disclosure.

Embodiment: A Method for Selecting the Shape of Optical Elements

Now we disclose example methods and procedures to select the shape of optical elements for systems with partial reflectors.

In an exemplary case, the number and type of optical elements (e.g. the 4 optical elements in FIG. 2) is selected, and then their placement, shape, and material properties are represented by mathematical parameters. For example, placements can be represented by axial distances from the sensor; orientation can be represented by degrees of tilt; shape can be represented by front and back curvature (for a spherical element) or the parameters of a spline or other function (for aspherical elements, e.g. lens 204 in FIG. 2); and material properties can be represented by parameters for the index of refraction, light absorption and scattering of the material. Exemplary parameters can include optical element shape parameters (thickness, diameter, radiuses of curvature, conic coefficients and higher order shape coefficients e.g. for polynomial functions), material properties (indexes of refraction, parameters of reflectivity, absorption, scattering, etc.), coating properties, wavelength transmissivity or filtering parameters, aperture, scattering, impurities, thermal coefficients, and other optical and material parameters.

The method for optimizing the optical elements involves optimizing the selected free parameters in order to minimize a selected camera merit function. Selecting which parameters to set as free, and which to hold fixed, as well as selecting an appropriate camera merit function, is an art. An inventive component of the current application is this art of optimization for cameras with partial reflections. The free parameters of surfaces can include, but are not limited to: surface curvature radius (for a spherical optical element), or conic coefficients or higher order polynomial coefficients (for aspherical elements). In addition to free parameters, constraints can also be imposed. For example, the focal length can be constrained to match the distance the light travels from the first optical element to the sensor, when there is one round-trip reflection of light between the two partial reflectors (as in FIG. 2). Such a selection enforces that the system is selected to provide an in-focus image component for one round-trip reflection of light between the partial reflectors. Other exemplary constraints include minimum or maximum distances between optical elements, constraints on optical element curvature or thickness, constraints on image spot size from a point source, etc. Constraints can be exact (e.g. focal length must exactly match a value) or they can be ranges (e.g. focal length must be between a specified min and max value).

We disclose that a merit function is selected to reflect the desired system optical performance. For example the merit function can include parameters that represent effective focal length, MTFs (modulus of the optical transfer functions) at one or various object distances and settings, spot size at a point or across a portion of or the entire optical field, out-of-focus and focus shift effects, coma, astigmatism, field curvature, distortion, spherical and chromatic aberrations, wavefront errors, field distortion (pincushion or barrel distortion), vignetting, ghosting or flare, diffraction, and other types of aberrations, physical length constraints on a portion of or the entire system, etc. One, some, or all of these quantities can be multiplied by different weighting amounts. For example, if it is desired that MTF performance be enforced more strongly than vignetting, then the weight of the former can be made stronger than the weight of the latter.

Once the variable parameters of all of the optical elements, the merit function parameters and their weightings have been selected, then the optical system can be optimized as disclosed herein. This can be done either manually by adjusting values, or by using automated routines. The camera embodiments disclosed herein have been selected by an inventive art, by using inventiveness to select the number and type of optical elements, and further by manual adjustments and by the disclosed automation optimization steps, combined together into an iterative and inventive process. Selections and combinations of the above are possible, and are disclosed. It is further understood that the disclosed designs are exemplary, and many modifications, additions, and variations are possible.

This application discloses solving an optimization problem to help select the placement, shape, and materials of optical elements for exemplary systems. The mathematical part of the optimization problem can be solved by means known in the art of optical design or mathematical optimization, including by methods such as gradient methods, nonlinear algorithms, probabilistic search methods, branch and bound methods, neural nets, genetic algorithms, machine learning, AI (artificial intelligence) methods, etc. Once a solution is found, the number of elements can be changed, and the process repeated to arrive at a design selection. For example, this has been done for the selection of elements shown in the embodiment of FIG. 2 and the other figures in this application.

Inventive features of the current example include aspherical surfaces of the optical elements. For example, adding higher order polynomial modifications to the lens surface can result in significantly improved aberration reduction. We further disclose that the partially reflective surfaces do not need to be flat or planar. The partially-reflective surfaces can be made to have spherical or aspherical curvature. By allowing the partially reflective surfaces to deviate from planar, further improvements in optical performance can be realized. This is especially helpful for optical systems where the physical length is restricted by packaging requirements of mobile devices.

We note that the exemplary disclosure of our design selection methods is meant to be illustrative and not limiting. It is understood that other design selections are possible, including changing the number of elements, and using mathematical optimization to find other optical elements position, shape, and material choices. In particular, the number of light round-trips reflections that form a focused image on the sensor can also change. Designs can be selected for one, two, three, four, etc. partial reflection round trips.

Embodiment: System with Shaped Lenses and at Least One Shaped (Curved) Partial Reflecting Surface In an embodiment, the present invention provides for the reflective surfaces to also be shaped (curved) to reduce image aberrations. In an exemplary embodiment, a system with shaped lenses, two partial reflectors with a shaped (curved) reflective surface, and a sensor is disclosed such that a focused image is formed on the sensor after one round-trip reflection between the two partial reflectors, and is formed with reduced image aberration.

Optical element placement, size, and shapes were selected to enable high performance, as well as manufacturability and mass production. For example, the degree of curvature of lenses was selected to enable their manufacture by standardly available lens mass manufacturing methods.

Figure 3:
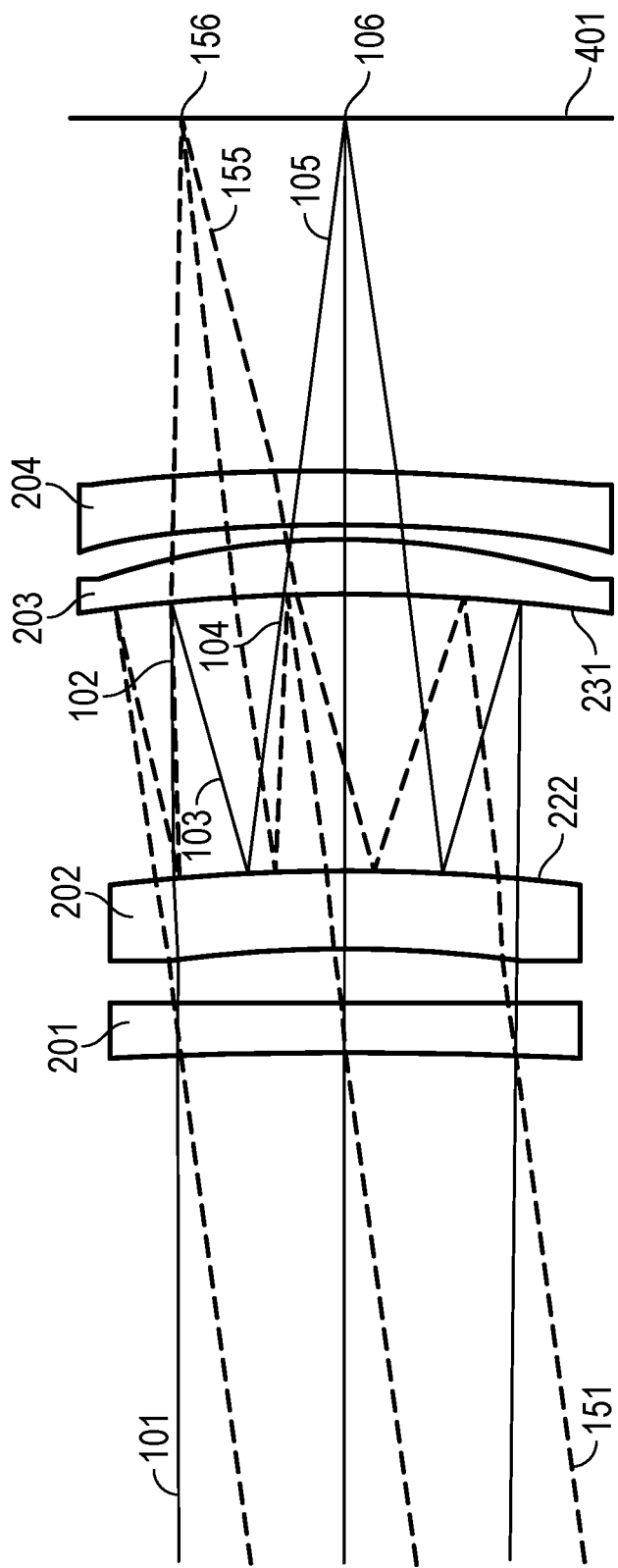
FIG. 3 shows a system with lenses, two partial reflectors with curved partially-reflective surfaces (labeled as 222, 231), and a sensor, wherein a focused image is achieved after one round-trip reflection between the partial reflectors. The number, type, placement, shape, and materials of the optical elements has been selected to reduce image aberrations.

The exemplary placement and shape of the optical elements (lenses, partial reflectors) is shown in FIG. 3, and has been selected to reduce image aberration of the focused image. Specifically incoming light from one angle (101) passes through a first lens (201), part of the light (102) then passes through the partial reflector (202) and undergoes one intended round trip reflection (102, 103, 104) by partially reflecting from the second partial reflector (203), a part of the light (105) then passes through the second partial reflector (203) and the second lens (204) to reach the sensor (401) at the focus point (106). Incoming light from a different angle (151) likewise passes through lens (201), part of it passes through the partial reflector (202) and undergoes one round-trip reflection, then passes through the second lens (203), and part of the light (155) then exits through the second partial reflector (204), to reach a focus point (156) at the sensor plane (401). For clarity only, the intended one round-trip reflection is shown, for both angles of incoming light. Other paths of the light (e.g. no round trip; and 2, 3, 4, etc. round trips) are not shown.

This application discloses that the reflective surfaces (222 and 231) of the partial reflectors have been shaped, by the methods disclosed herein, in addition to shaping of the lenses and the other sides of the partial reflectors (as previously disclosed in the context of FIG. 2). Thus This application discloses that the same methods and procedures can be used to select the shapes of the partially-reflective surfaces as this application discloses to select the shape of the non-reflective surfaces.

Embodiment: System with a Prism, Shaped Lenses, and at Least One Shaped (Curved) Partial Reflector Surface This application discloses that systems with partial reflectors can include prisms or angled mirrors. In an embodiment, the present invention provides for a system with a prism (can also be an angled mirror), two lenses, two partial reflectors whose partially-reflective surfaces are shaped, and a sensor, such that a focused image is formed on the sensor after one round-trip reflection between the two partial reflectors, with reduced image aberration. Because the light interacts with the partial reflector surfaces multiple times, a slight change in these surface shapes can have a significant impact on the overall optical performance and on aberration reduction. By allowing the partially reflecting surfaces to be non-planar it is possible to further improve the optical performance while at the same time keeping the optical length of the system short.

This embodiment was selected by a combination of experience, innovation and mathematical optimization. Specifically, optical element placement, size, and shapes were selected to enable high performance, as well as manufacturability and mass production. For example, the degree of curvature of lenses was selected to enable their manufacture by standardly available lens mass manufacturing methods.

Figure 4:
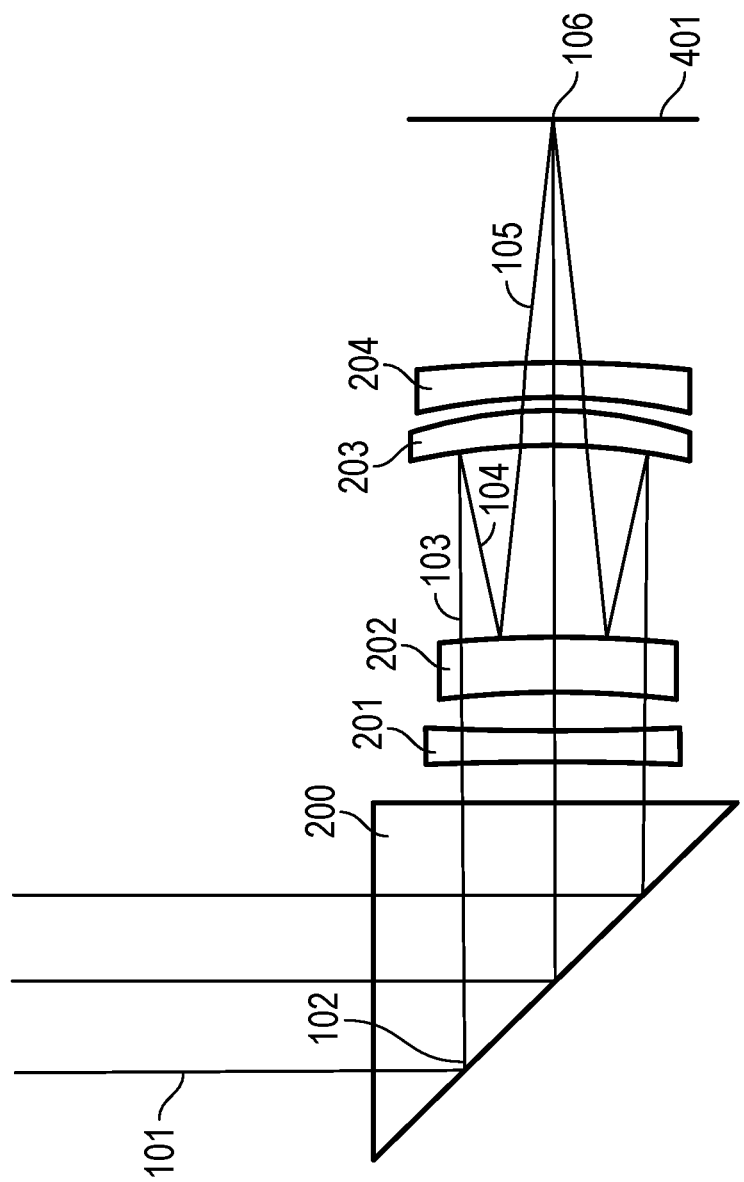
FIG. 4 shows a system with a prism (labeled as 200), lenses, two partial reflectors, and a sensor, wherein a focused image is achieved after one round-trip reflection between the partial reflectors, and the number, type, placement, shape, and materials of the optical elements has been selected to reduce image aberrations.

The exemplary placement and shape of the optical elements (prism, lenses, partial reflectors) is shown in FIG. 4, and has been selected to reduce image aberration of the focused image. The prism could be replaced by an angled or cornering mirror. Specifically incoming light (101) is turned substantially 90 degrees by the prism (200), passes through the first lens (201), a portion of the light (103) then passes through the first partial reflector (202), undergoes one round-trip partial reflection (103, 104), and a portion of this light (105) passes out through the second partial reflector (203), then passes through the second lens (204), and reaches the sensor (401). The light that has experienced one round-trip partial reflection reaches the sensor plane in focus (to focal point 106). For clarity only, the light paths for zero, two, and greater than two round trip partial reflections are not shown.

This application discloses that front and back surfaces of the two lenses (201, 204) and front and back surfaces of the two partial reflectors (202, 203) have been shaped, by methods disclosed herein, so as to bring the light in-focus to the image plane (401) after one round-trip reflection and further to reduce image aberrations and improve image quality.

Embodiment: System with Flat Partial Reflectors, Shaped Lenses, and an Angled Mirror Between the Lenses In an embodiment, the present invention provides for 90 degree turning of the light path that occurs between the partial reflectors. Thus in another exemplary embodiment, a system with lenses, two partial reflectors, an angled mirror at substantially 45 degrees between them, and a sensor, is designed such that a focused image is formed on the sensor with reduced image aberration after one round-trip reflection between the two partial reflectors. Here the optical element (angled mirror) that turns the light substantially 90 degrees is located between the partial reflectors. Placing the turn mirror between sets of optics can reduce the number of optical elements and decrease the total volume occupied by the optical system. Additionally, because the light paths now reflect off the mirror surface multiple times for one or multiple round-trips, hence small changes of the angle of this mirror will have significant influence on the position of the image on the sensor, making active electro-mechanical control of this mirror a more effective method of achieving image stabilization and object tracking.

Optical element placement, size, and shapes were selected to enable high performance, as well as manufacturability and mass production. For example, the degree of curvature of lenses was selected to enable their manufacture by standardly available lens mass manufacturing methods.

Figure 5:
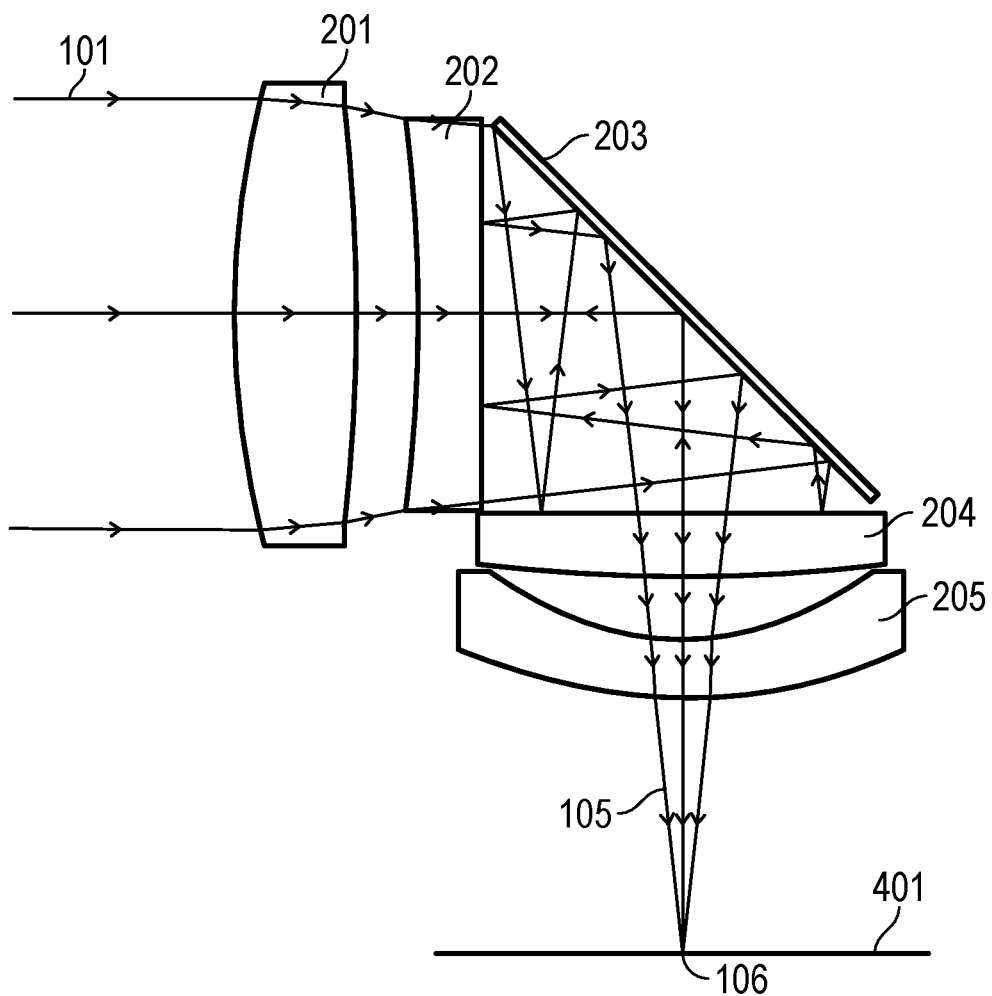
FIG. 5 shows a system with lenses, an angled mirror (labeled 203), two partial reflectors, and a sensor, wherein the angled mirror is placed between the partial reflectors, and a focused image is achieved after one round-trip reflection between the partial reflectors, and the number, type, placement, shape, and materials of the optical elements has been selected to reduce image aberrations.

The exemplary placement and shape of the optical elements (lenses, partial reflectors, angled mirror) is shown in FIG. 5, and has been selected to reduce image aberration of the focused image. Specifically incoming light (101) enters through the first lens (201), a portion of that light passes through the first partial reflector (202), is turned by the angled mirror (203), and then a portion of that light undergoes a round-trip reflection where it reflects of both reflectors and the angled mirror, before a portion of this light exits the second partial reflector (105) to reach the sensor (401). The light that has experienced one round-trip partial reflection reaches the sensor plane in focus (to focal point 106). The light path for zero and two or more round-trip partial reflections will arrive at the sensor out of focus. For the purpose of illustration clarity only, these paths for zero and two or more round-trip reflections are not shown in FIG. 5.

In this example, this application discloses that the front and back surfaces of the two lenses (201, 205) and the non-reflecting surfaces of the two partial reflectors (202, 204) have been shaped, whereas the partially-reflecting surface of each partial reflector has been left flat. Shaping was carried out by the methods and procedures disclosed herein, to bring the light in-focus (106) to the image plane (401) after one round-trip reflection, and to reduce image aberrations.

Embodiment: Selecting Other Optical Parameters, to Reduce Aberrations for Systems with Partial Reflectors In addition to selecting the shape and placement of optical elements for systems with partial reflections, we further disclose selecting other parameters to reduce image aberrations. For example, this application discloses selecting optical properties such as indexes of refraction, reflectivity, transmissivity, scattering and absorption. These parameters can be selected from ranges, or from a list of available values. Ranges may correspond to ranges that are available or manufacturable. For example, there may be a range of curvatures that can be manufactured for glass or plastic lenses, or for aspherical elements there may be a range of manufacturable shapes that can be described by a range of conic or polynomial function parameters. Selection from a list may correspond to a list of available lens or partial-reflector shapes, and/or it may correspond to a list of materials parameters (indexes of refraction, refraction, reflectivity, transmissivity, scattering and absorption, and/or parameters for available surface coatings) for available glass or plastic materials. This application discloses that selecting such values is a part of the art, methods and procedures to optimize systems with partial reflections, and includes optimizing them for reducing aberrations and for aiding image correction and processing.

In embodiments, the present invention provides for using traditional or non-traditional lens materials and geometries, in order to further improve the image quality. For example, GRIN (GRadient INdex) lenses in which the refractive index of the material is made to vary in a systematic way as a function of position within the lens, such lenses could be used. Parameters to describe GRIN lenses can be made free parameters in our disclosed optimization approach, and can be optimized for systems with partial reflectors.

Embodiment: Focusing, Zooming, and Near-In "Macro Photography" for Systems with Partial Reflectors Disclosed next is an improved method of changing focal length (focusing, zooming). In a conventional camera, at least one lens or optical element can be moved back and forth to change the focal length of the system. In a cell phone or mobile device, the distance that a lens or optical element can travel back and forth is limited by the thickness of the device and/or by the thickness of the camera it contains, and also by the space taken up by the other elements of the camera (other lenses, sensor, aperture, shutter, filters, PCB board, etc). Thus the degree of focusing or zooming possible in a conventional cell phone or mobile device camera can be limited. In particular, it can be difficult or not possible to focus on objects that are near the phone or mobile device.

Figure 6A:
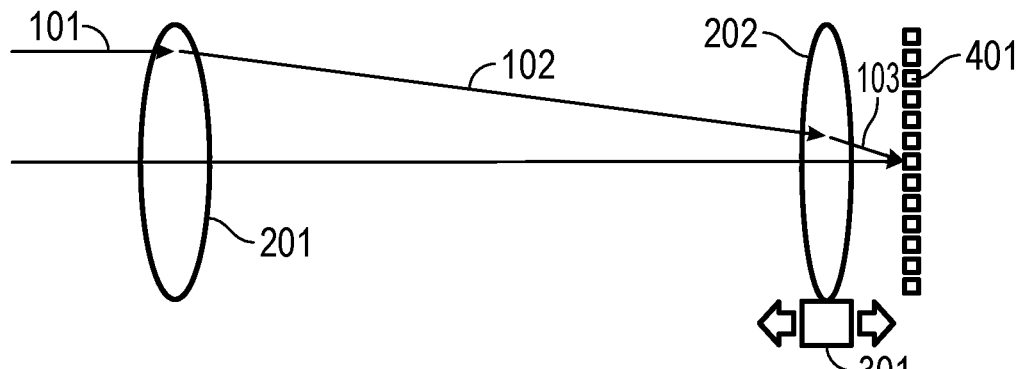
FIG. 6A shows a conventional system with two lenses, and a sensor, wherein the second lens (labeled 202) can be moved back and forth by the actuator (labeled 301) to vary the focal length and achieve focusing and zooming.

Methods and systems disclosed herein can overcome the above limitation. A small back and forth motion of an optical element or elements for a system with partial reflectors can result in a larger change in focusing or zooming (e.g. in focal length) than would be the case for a system without partial reflections. Referring to FIG. 6A, in a conventional camera, here represented only for clarity of illustration as just two lenses (201 and 202), the distance between these two lenses is LA1, and the path of light from outside to the sensor (101, 102, 103 to 401) traverses the distance LA1 only once. Thus mechanically moving the second lens (using actuator 301) by a distance $\Delta x$ changes the distance between the two lenses also by just $\Delta x$. This changes the focal length of the conventional camera by some amount $\Delta y$, and this available amount can be used for focusing and zooming.

Figure 6B:
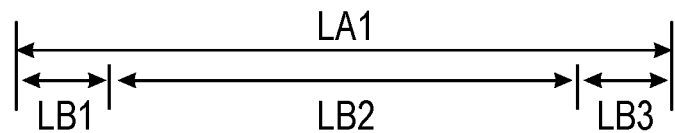
FIG. 6B shows a system with two lenses (211, 214) and two partial-reflectors (212, 213), and a sensor (411), wherein the second partial reflector and the second lens (213 and 214) can be moved back and forth together by the actuator (311) to vary the focal length and achieve focusing and zooming.
Figure 6B:
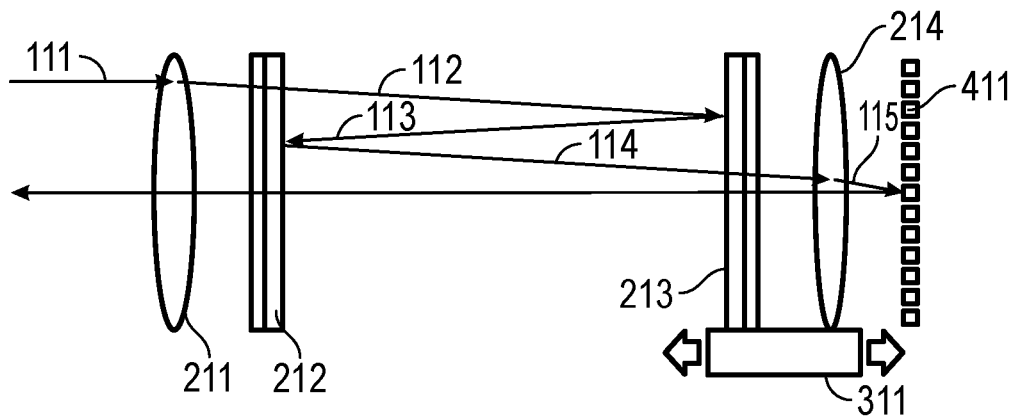

In contrast, referring now to FIG. 6B, in a camera with partial reflections, the distance between the two lenses is still LA1 (which is equal to LB1+LB2+LB3), but the path of light from outside to the sensor (111, 112, 113, 114, 115, to 411) traverses the distance LB2 three times for one round trip reflection. Now mechanically moving the second partial reflector and second lens together (using actuator 311) a distance $\Delta x$, that changes the light-path distance traveled between the two lenses 211 and 214 by 3 $\Delta x$ (by three times as much as for a conventional camera). If the system is instead operating using two round trip reflections, then moving the actuator by a distance $\Delta x$ changes the light-path distance traveled between the two lenses by 5 $\Delta x$ (by five times as much as for a conventional camera), and so on. Thus partial reflections allow a small optical element mechanical travel distance $\Delta x$ to have a larger (multiplicative) change in light path length, e.g. of 3 $\Delta x$, 5 $\Delta x$, etc. Therefore the focal length will change for example by 3 $\Delta y$, 5 $\Delta y$, etc., as compared to a conventional camera where it would only change by $\Delta y$ as described above.

This application also discloses that other optical elements can be moved, singly or in various combinations, with lenses. For example, moving just the second partial reflector 213 by $\Delta x$ will change the light-path distance between the two lenses 211 and 214 by a distance of 2 $\Delta x$ for one round trip partial reflection, by 4 $\Delta x$ for two round trips, etc. Hence there is a beneficial multiplicative effect for moving partial-reflectors, just as there is for moving lenses. This application discloses that this can be used to improve image stabilization and auto-focus in cameras and imaging systems for mobile devices, because now small movements of optical elements will improve the available amount of focal length change for zooming, focusing, and image stabilization.

Thus for a system with partial reflections, if a partial reflector is moved by a distance d, then the corresponding change in the light path length is 2K d where K is the number of round-trip partial reflections. This means that to effect a change in the light path length of $\Delta L$, we need only mechanically move the partial reflector by $d=\Delta L/2K$. With partial reflections, the required mechanical motion is $1/(2K)$ shorter than without partial reflections. For example, with K=2 round trip partial reflections, one quarter the motion will provide the same zoom capability as a full motion of an optical element for a system without partial reflections.

Further, this application discloses that one or more lenses that are actuated can be arranged between the partial reflectors. In such an embodiment, light can pass through said actuated lens or lenses multiple times and that can provide a multiplicative effect for zooming, focusing or image stabilization. The optimization methods disclosed herein can be used to design systems with such one or more actuated lenses between the partial reflectors.

Thus this application discloses using partial reflections to allow the available travel distance for one or more optical elements to enable covering a larger focusing or zooming range than would be possible for a conventional camera. We further disclose that the optimization methods described above can be used to help select the shape (e.g. curvature or aspheric shape) of partial reflectors and lens or lenses, and also to select which elements will be moved how much, to ensure zooming and focusing can be maximized and thus varied effectively over a much larger range than would be possible in a conventional camera. Overall, this application discloses that a system with partial reflectors wherein light interacts with at least one optical element more than once, such a system enables improved zooming or focusing range, and in particular also enables focusing on objects that are near the camera ("macro photography").

With regard to "macro photography", modern cell phone cameras have limitations for taking an in-focus image of an object too close to the mobile device. For example, most conventional phone cameras cannot be brought within approximately less than 4 centimeters of an object and still achieve an in-focus photograph. This is because the size of the phone camera and the number of lenses in that camera limits how much the lenses inside that camera can be made to travel mechanically to accommodate focusing on near-in objects.

This application discloses using partial reflections to overcome this limitation and both get closer to the object and achieve higher magnification, thus accruing a double benefit (e.g. a small object is both closer when still in focus and is magnified more, thus doubly improving photography of nearby objects). Hence our disclosed system can, for example, be brought closer to a small insect or a flower than the 4 centimeters that is possible for current phones, and also magnify the insect or flower more than is possible with current cell phones.

Thus for a small volume camera where the mechanical motion of optical elements is restricted by its size, like in a cell phone, this application discloses that partial reflections provide an advantage. Now the same mechanical range of motion will allow a greater range of focusing and zooming. With partial reflections, a cell phone camera could therefore focus onto an object that is substantially closer than, for example, 4 centimeters away (thus enabling improved "macro photography"). Alternatively, if the same zoom range is all that is desired, then with partial reflections, less mechanical motion will achieve that same zoom range, and the camera design can be simplified providing savings in cost and complexity. Thus partial reflections can either decrease the amount that optical elements need to be moved, or conversely, for the same range of motion, can increase the range of zoom and focusing for an available amount of optical element mechanical motion range.

Embodiment: Image Processing Methods for Systems with Partial Reflectors

In embodiments, the present invention provides for image processing methods and algorithms for high-magnification camera systems with partial reflectors, including algorithms that reduce image aberrations. This application discloses that algorithms that include deconvolution, that include characterization and use of point spread functions, of unsharp masks, of high-pass filtering, and other methods, that these algorithms can extract the in-focus component of the image and can be used to process images and improve image quality. In particular, they can be used to reduce image aberrations. Such algorithms may be incorporated into an imaging system such as for a mobile device (cell phone, tablet, laptop), digital video camera, a digital still-image camera, or any other imaging system with partial reflections.

Figure 7A:
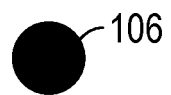
FIG. 7A shows a schematic of an ideal imaging transfer function for a conventional camera where there is one light path. This transfer function is a tight spot (label 106).
Figure 7B:
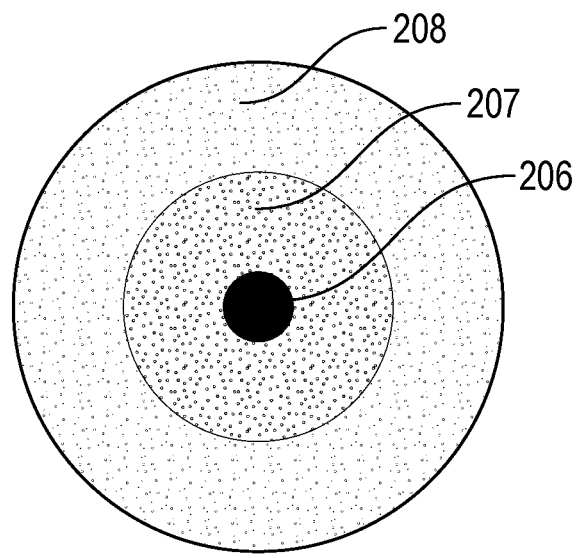
FIG. 7B shows a schematic for the more complex imaging transfer function for a camera with one or more partial reflections and multiple light paths. This transfer function has additional larger and dimmer spots due to the partial reflections (labels 207, 208).

Referring now to FIGS. 7A and 7B, this application discloses deconvolution image correction for systems with partial reflectors. In a system with partial reflections, the image on the sensor is distorted by a sum of out-of-focus images with an in-focus image (FIG. 7B). This constitutes an approximately linear transformation of the image with an appropriate transfer function. Disclosed herein are methods to extract the desired (undistorted, or minimally distorted in-focus image) from an image formed on the sensor that has been distorted by the sum of in-focus and out-of-focus partial reflections.

One embodiment includes a system or method in which the image extraction uses deconvolution via an optical transfer function for a system with partial reflections. A transfer function is essentially the response of the imaging optics to a plane wave input. For a single lens, the ideal transfer function is a tightly focused spot (106), as shown in FIG. 7A.

Conversely, for a system with one or more partial reflections, the transfer function appears as in FIG. 7B. The tight focus spot (206) is for the intended number of partial reflections. It is accompanied by multiple loosely focused spots (207, 208) corresponding to other numbers of round trips and hence other path lengths of the light. These other light path lengths create the de-focused images on the imaging sensor. Hence in the spatial domain the transfer function distorts the acquired image C(i, j) according to the convolution equation $$C(i, j) = \sum_{a,b} h(a - i, b - j)R(a, b)$$

where R(a, b) is the in-focus image, and h is the transfer function. In the frequency domain this convolution becomes a product $$C(u,v)=H(u,v)R(u,v).$$

To obtain the in-focus image for our system with one or more partial reflections, this application discloses applying a deconvolution algorithm $$R(u,v)=C(u,v)/H(u,v).$$

Also disclosed is using other algorithms which may also be applied to perform this deconvolution, for example in a numerically more efficient way, or to eliminate or reduce numerical errors.

We further disclose using unsharp masks to extract the in-focus image component for systems with partial reflections. In this approach we subtract a blurred version of the image on the sensor from the original image. The blurred version provides an estimate for the out-of-focus images. The blur radius and weighting are adjustable parameters that are optimized to achieve the best image quality.

Also disclosed is using high pass filtering image correction for systems with partial reflections. In a system with partial reflections, the out-of-focus components of the image will have largely low-frequency spatial components. But the in-focus image will have high-frequency components. By eliminating the low-frequencies we may effectively remove the out-of-focus components while preserving most of the in-focus image which resides in the higher frequency ranges. Thus this application discloses using high-pass filtering to extract the in-focus image.

In addition to increasing the zoom range by moving optical elements (lenses, partial reflectors, or prisms/angled-mirrors), we additionally disclose increasing the zoom range even further by utilizing different numbers of partial-reflection round trips. By moving optical elements within our camera, so that we achieve an in-focus image for a different number of round trips (e.g. K+1 round trips rather than K), then we may achieve a larger focal length without increasing the form-factor of the imaging system. For example, the system may first extract an in-focus image after one round-trip, then extract it after two round-trips, then after three, etc., or in reverse. The resulting in-focus image would be extracted using the same methods as previously disclosed. This would combine the benefits of both moving optical elements and using the most desirable number of round trip partial reflections to maximize zoom and focusing range.

Embodiment: Exploiting Spectral Transmission (e.g. Color) to Reject Out-of-Focus Image Components for Systems with Partial Reflectors This application discloses an inventive method to reject out-of-focus components of the image formed on the sensor by engineering the spectral transmission of one or more partial reflectors. In an exemplary case, if the partial reflectors fully transmit red light (do not reflect any red light), but partially reflect light at other colors (e.g. partially reflect blue and green light), then the in-focus image that relies on K round-trip partial reflections will not contain any red light. Thus red light can be used to determine which parts of the image should be subtracted as out-of-focus "single-pass" components, and light at other frequencies can be used to determine which part of the image is the desired in-focus part. Thus exploiting color selection in the partial reflectors can aid in extracting the in-focus part of the image.

A person knowledgeable in the art of photography, optics, and image processing will recognize that the above inventive method can be implemented in many ways, including in ways that provide for high image quality. For example, the partial-reflectors may transmit light at a narrow frequency band (e.g. only a specific shade of red), so that the spectrum of light that is not available for the in-focus part is minimized. Other modifications are also possible, including selecting colors that are or are not partially-reflected, and extraction of the in-focus image component by exploiting different colors and frequencies of light, for systems with partial reflections.

Hence we further disclose, for instance, a partial reflector that is partially reflective at some wavelengths (e.g. blue and green), but is transmissive at other wavelengths (e.g. red). The red channel then provides an estimate of the out-of-focus image which can be used to correct the blue and green channels.

Embodiment: Sensor Dark Levels for Systems with Partial Reflectors

In an embodiment, the present invention also provides for a system with a lens, partial reflectors, and time-integrating sensor array, wherein some elements of the sensor array measure light intensity in order to set the dark level for the other sensor elements.

This application discloses features and elements to enable dark level correction for systems with partial reflectors, including dark level correction prior to analog to digital conversion. When integrating multiple defocused images on the sensor due to one or more partial reflections, the formed image can acquire a large background level. After analog to digital conversion, this background will reduce the pixel depth by compressing the relevant pixel levels to the top end of the digital values.

To eliminate this reduction of pixel depth, this application discloses performing dark-level correction prior to digital-to-analog conversion using additional pixels whose purpose is to sample the intensity at each point on the sensor. Thus this application discloses adding additional pixels to, in part, measure background intensity. The signal from these pixels can be used to adaptively set the dark level of the sensor elements (e.g. pixels in a CCD or CMOS camera), allowing the reconstruction of the original image without loss of pixel depth. For instance, the values of these pixels can be used to determine a voltage offset for each signal prior to analog to digital conversion, which will eliminate the unwanted background induced by multiple out-of-focus reflections. Each pixel could act as an individual input for the offset level, or alternately each offset can be set by averaging multiple nearby pixels.

Embodiment: Multiple and Varying Duration Exposures for Systems with Partial Reflectors Further disclosed is a method to reconstruct a focused image without losing pixel depth by taking multiple exposures and using low exposures to correct for the out of focus component of the higher exposures. This application discloses taking multiple exposures to get estimates of image and background, for systems with partial reflectors. For an exemplary system with partial reflectors, different light paths will visit these partial reflectors a different number of times. This application discloses matching the dynamic range of the sensor to selection of transmission, for example match sensor dynamic range to a desired number K of round-trip partial reflections.

This application discloses using HDR (high dynamic range) methods for systems with partial reflections. In an exemplary setting, this application discloses taking one image of the scene, then taking another image of the same scene but with double the exposure, and then taking a third image of the scene with quadruple the exposure. The first image will capture well the background level generated by the out of focus images, while the higher exposures will progressively capture more detail from the in-focus image. This information can then be used to reconstruct the in-focus image from all of the exposures. Then can splice the images together to create one composite image that has a high dynamic range, that captures both dimly and brightly illuminated parts of the scene (that maximizes contrast). A person skilled in the art of optics, image processing, and photography, will recognize that there are many variations of such a method, e.g. including more than 3 images, varying exposure times, etc. and those variations are included in this disclosure. Specific embodiments may be operated and executed with different computer processors, memory configurations, and data structures.

The embodiments of the invention described herein can be implemented as logical steps in one or more computational processing systems. The implementation is a matter of choice, dependent on the performance requirements of the processing system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or unless a specific order is inherently necessitated by the claim language.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. An imaging system comprising:
   a first lens configured to receive light from the scene;
   a first partial reflector;
   a second partial reflector arranged to define a multi-pass optical path through which at least some light from the external object travels more than once between the first and the second partial reflector;
   a sensor positioned to receive the multi-pass light from said partial reflectors, wherein said sensor is located at a distance from the first lens that is less than an overall focal length of the system; and
   at least one lens or partial reflector is shaped or curved to reduce image aberrations in the composite image recorded on the sensor.

2. The imaging system of claim 1, wherein the first lens is an aspherical shape, thereby reducing image aberrations in a recorded image.

3. The imaging system of claim 1, wherein at least one of the first or second partial reflector is an aspherical shape to reduce image aberrations.

4. The imaging system of claim 1, further comprising a prism or angled mirror.

5. An imaging system for capturing a scene, comprising:
   a sequence of two or more lenses arranged along an optical path;
   a first partial reflector and a second partial reflector each configured to partially transmit and partially reflect light from the scene;
   a sensor to receive light from the second partial reflector, wherein the system has an overall focal length; the overall focal length is greater than the distance between the first lens and the sensor; and the sequence of lenses reduces image aberrations that undergoes multiple partial reflections between said first and second partial reflectors before forming an image on the sensor.

6. The imaging system of claim 5, wherein at least one lens is an aspheric lens shape to reduce image aberrations across the folded or multi-pass optical path.

7. The imaging system of claim 5, wherein light from the scene is partially reflected at least once by each partial reflector, causing the distance between the first and the second partial reflector to be traversed multiple times before forming an in-focus component of the image on the sensor.

8. The imaging system of claim 5, wherein at least one lens in the sequence has a focal length exceeding the physical distance from the lens to the sensor, such that the optical path is folded by partial reflections to form an in-focus image on the sensor.

9. The imaging system of claim 5, further comprising a prism or angled mirror positioned to fold or redirect the multi-pass optical path between the partial reflectors and the sensor.

10. A method to produce an image of an object, comprising:
    acquiring incident light from the object into an optical assembly including at least one lens and at least two partial reflectors such that the light undergoes one or more multi-pass partial reflections between the partial reflectors,
    acquiring a composite image on a sensor, the composite image being formed from the sum of light rays that have traversed different partial-reflection paths; and
    processing the composite image from the sensor to derive a focused image of the object using a computational correction that accounts for out-of-focus or multiple intermediate images present in the composite image of the object.

11. The method of claim 10, wherein software and hardware process an input and that is a sum of an in-focus object or scene and several out-of-focus copies of the object or scene, and that produces at its output an in-focus image of the object or scene.

12. The method of claim 10, wherein the processing includes a deconvolution algorithm configured to model the multi-pass partial reflection point-spread function, thereby enhancing the in-focus portion of the image.

13. The method of claim 10, wherein the processing includes applying unsharp masks.

14. The method of claim 10, wherein the computational correction includes high pass filtering to enhance detail in the composite image.

\* \* \* \* \*